United States Patent [19]

Zaguli

[11] Patent Number: 5,335,881
[45] Date of Patent: Aug. 9, 1994

[54] ATTACHMENT DEVICE

[75] Inventor: Ronald J. Zaguli, League City, Tex.

[73] Assignee: The United States of America as represented by the Administrator of the National Aeronautics and Space Administration, Washington, D.C.

[21] Appl. No.: 48,041

[22] Filed: Apr. 14, 1993

[51] Int. Cl.⁵ .............................................. B64G 1/60
[52] U.S. Cl. .............................. 244/158 R; 294/86.4; 403/322; 403/241; 244/48.5; 244/161; 248/316.5; 248/74.1
[58] Field of Search ................ 244/137.4, 158 R, 161, 244/118.5; 89/1.53; 294/86.4, 66.1, 82.26; 248/316.5, 74.1; 403/322, 241

[56] References Cited

U.S. PATENT DOCUMENTS

| | | | |
|---|---|---|---|
| 3,174,706 | 3/1965 | Wagner | 244/1 |
| 3,547,375 | 12/1970 | Mackey | 244/1 |
| 3,652,042 | 3/1972 | Welther | 244/1 SS |
| 3,802,714 | 4/1974 | Freegard | 280/11.13 W |
| 3,854,738 | 12/1974 | Fish | 280/11.13 W |
| 3,907,225 | 9/1975 | Welther | 244/158 |
| 4,027,896 | 6/1977 | Frechin et al. | 280/618 |
| 4,407,180 | 10/1983 | Regnat | 8/1.53 |
| 4,441,674 | 4/1984 | Holtrop | 244/137.4 |
| 4,508,296 | 4/1985 | Clark | 244/158 R |
| 4,647,062 | 3/1987 | McDougall | 280/607 |
| 4,702,447 | 10/1987 | Westwood, III | 248/316.5 |
| 4,718,709 | 1/1988 | Myers et al. | 244/161 |
| 5,040,748 | 8/1991 | Torre et al. | 244/158 R |
| 5,052,639 | 10/1991 | Lemacon | 89/1.53 |

*Primary Examiner*—Galen L. Barefoot
*Attorney, Agent, or Firm*—Russell E. Schlorff; Guy M. Miller; Edward K. Fein

[57] ABSTRACT

An apparatus is disclosed for capturing and holding a rod, bar or similar member; the apparatus having in one aspect a body member with a recess therein and a hook extending from the body member, the hook and recess defining a capture envelope for receiving and confining the rod etc. In one aspect such an apparatus is disclosed in which the hook is movable with respect to the body member to vary the size of the capture envelope, both to initially facilitate emplacement of the apparatus about the rod, etc., and then to provide for tightening of the apparatus about the rod, etc., if desired.

16 Claims, 7 Drawing Sheets

ATTACHMENT DEVICE

ORIGIN OF THE INVENTION

The invention described herein was made by an employee of the United States Government and may be manufactured and used by or for the Government of the United States of America for governmental purposes without the payment of any royalties hereon or therefor.

BACKGROUND OF THE INVENTION

1. Field of The Invention

This invention is related to an attachment device for attaching an item to a member, e.g. an item such as a portable foot restraint to a member; and in one particular aspect to such a device for connecting a foot restraint to part of a space shuttle in outer space.

2. Description Of Related Art

Attaching an astronaut to part of a space station or part of a space shuttle, e.g. to the end of a remote manipulator system (RMS) can provide a stable work platform for scheduled or unscheduled/contingency Extra-Vehicular Activity (EVA) tasks. Examples of these are: removing ice from a dump nozzle; attaching a fly-swatter to the RMS to attempt satellite activation; and generic payload jettisch including unbolting passive latches, cutting electrical connections, and assisting jettison of payloads. One device currently available for securing an astronaut to the end of the RMS is the Manipulator Foot Restraint (MFR). A decision to launch an MFR, which weighs 104 pounds, on a space shuttle or other vehicle must be made every flight. If it is not manifested, contingency EVA's can only be performed while a crewman holds onto some part of the vehicle, e.g., on the space shuttle a handrail on the RMS end effector. This type of operation is considered more risky than if an MFR were available.

The prior art includes a variety of references. U.S. Pat. No. 5,040,748 discloses a device and method to secure a payload to a multiple payload adapter ring. A latching mechanism is provided with jaw links and associated berthing pins to secure a payload. An electrical solenoid cooperates with biasing springs and the latching mechanism to unlatch the latching mechanism.

U.S. Pat. Nos. 3,907,225 and 3,652,042 disclose spacecraft for deploying objects into selected flight paths in space. The spacecraft in each instance provides a carrier ring that is carried by a launch vehicle into space for deployment of the payloads. The carrier rings are provided with interfaces which provide one or four points of support for a payload.

U.S. Pat. No. 3,547,375 discloses a passive release mechanism for release of a space vehicle. This mechanism discloses a pedestal which is provided with a plurality of ball-lock pins for securing a payload on the pedestal. When it is desired to separate the payload from the carrier the lock-pins are withdrawn into the pedestal and the pedestal itself is lowered away from the payload. The carrier and the pedestal are then removed from the payload to passively release the payload into a desired position in space.

U.S. Pat. No. 3,174,706 discloses a separation device for retention of a pair of components in axial engagement and for release of the components responsive to a signal. A satellite and a space vehicle are provided with mating flanges that are separably clamped by a plurality of clamps. In response to the detonation of certain squibs, the clamps are moved outwardly to free the satellite and a spring loaded plunger propels the satellite away from the space vehicle.

U.S. Pat. No. 4,508,296 discloses a hemispherical latching apparatus for retaining a payload within the cargo bay of a space shuttle. The apparatus provides a plurality of complimentary spherical latching elements which automatically align and engage with one another when the payload is moved into a docked payload position in the bay. An electric motor withdraws a locking pin from each latching element to permit the payload to be moved from the cargo bay of the space shuttle for placement in a desired position.

U.S. Pat. Nos. 3,802,714 and 3,854,738 disclose pads or decks for a foot restraint on a mono-ski. The deck is a one-piece construction and can be detached from the ski.

U.S. Pat. No. 4,027,896 discloses a ski binding which consists of a foot pad that is releasably engaged or disengaged from the ski by a hook-line member.

U.S. Pat. No. 4,647,062 discloses a hook-like mechanism for a ski assembly that has a general hook/bar engagement means. It links a platform to two runners. The device uses a linkage to vary the amount of angular interface between the device and a member to which it is attached.

SUMMARY OF THE PRESENT INVENTION

The present invention, in one embodiment, discloses an attachment device for attachment to a rod or bar which in one particular aspect is especially suited for connection thereto of a portable foot restraint. The attachment device is attachable to a bar, rod, or other similar member so that another item, such as a foot restraint, can be connected to another member at a desired location [e.g. on an end of a space shuttle's remote manipulator system (RMS)] and then easily disconnected and re-located as needed.

In one aspect, an attachment device according to the present invention has a body to which are secured two foldable outriggers which rest on part of a member (e.g. an RMS end effector) to which the attachment device is releasibly secured. A hook link clamps around part of the member, e.g. a striker bar. Turning a knob secured to a first shaft which threadedly engages a second shaft moves a hook link up and down, the hook link secured to second shaft. Upward hook movement tightens the hook link around the striker bar.

In another embodiment, a device according to the present invention has a body member with a recess therein on a side thereof into which a rod or bar can be disposed, the hook extending from the body member in the recess, a part of the hook and a part of the recess defining a capture envelope for receiving a rod or bar and confining it therein. By sizing and configuring the hook and the recess as desired, the capture envelope is sized and configured so that looser and tighter fits about the rod or bar are possible.

In another embodiment a capture device according to the present invention includes a body member with a recess therein on one side thereof and a shaft channel therethrough; a shaft extending through the shaft channel with portions thereof extending beyond opposite sides of the body members, the shaft frictionally engaging an interior surface of the shaft channel and held therein by exterior contact between the shaft's exterior and the channel's interior surfaces; a hook on an end of the shaft on the same side of the body member as its recess; and the hook and a portion of the recess defining a capture envelope for receiving and confining the rod. Such a device in other embodiments has one more, or all of the following characteristics, apparatuses, aspects, or features: the shaft is movable within the shaft channel by overcoming force of the frictional contact between the shaft and the shaft channel, the shaft movable to move the hook toward the body recess to reduce size of the capture envelope and secure the device about the rod; the shaft is threadedly engaged with mating threads in the shaft channel, and movement of the shaft is effected by rotating it in the shaft channel; a knob on an end of the shaft on a side of the body member opposite the side on which the hook is located, and releasable locking means for locking the knob in position so that its movement is prevented until the locking means is released; the hook movably connected to the shaft, and urging means contacting the hook for urging the hook toward the rod; the hook having a hook extension member which when pulled away from the rod overcomes force of the urging means releasing the hook from the rod; the rod is secured to a rod support member and the device includes at least one leg extending from the body member for contacting the rod support member to stabilize contact between the device and the rod; the at least one leg is two legs, one of each of the two legs extending from opposite sides of the body member; the two legs are movably secured to the body member for accommodating support members of varying size, the legs foldable inwardly and releasably secured for preventing movement thereof upon disposition on a support member; a contingency release bar releasably secured to the body member in contact with the at least one leg, release of the contingency release bar permitting movement of the at least one leg to free the device from about the rod; mounting means secured to the body member for mounting an apparatus on the device, the apparatus securable to or in the mounting means; the mounting means is releasably secured to the body member; the shaft comprises a first shaft member and a second shaft member the first shaft member rotatable within the shaft channel, the first shaft having a threaded second shaft channel therein, the second shaft threadedly engaging the threaded second shaft channel so that upon rotation of the first shaft the second shaft is movable with respect to the body member, and the hook is connected to an end of the second shaft; light reflector means secured thereto for reflecting light; indicator means on the body member for visually indicating whether the capture envelope has been reduced in size and the device is tightly secured about the rod; and or each at least one leg has a pressure distributing reaction foot at an end thereof for distributing pressure on the support member.

Some, but not all objects therefore of at least certain preferred embodiments of the present invention include:

New, useful, unique, efficient, and effective capture devices for confining and/or holding a rod, bar, or similar member;

Such devices with a movable hook which can be disposed in multiple configurations to varying capture envelope size or tightness about a rod;

Such devices with movable legs or out riggers for stabilizing the device on a support member or for folding to minimize stowage size;

Such devices with contingency release mechanisms;

Such devices useful in outer space for securement to parts of space vehicles or equipment; and to which are connectable mounts for other items such as socket mounts for portable foot restraints; and Such devices with apparatus for indicating the status of the device with respect to a rod or bar captured thereby; including e.g. with respect to a striker bar on an RMS end effector arm, the status as "Open", "Soft Dock", or "Closed".

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
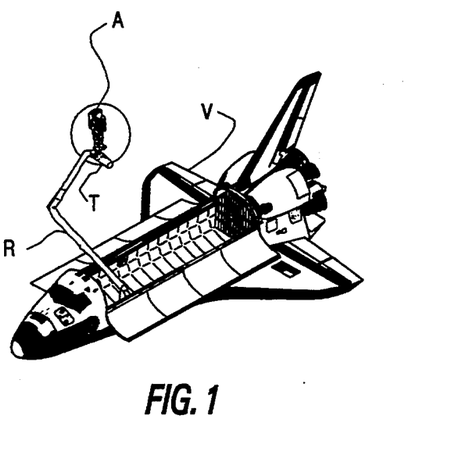
FIG. 1 is a perspective view of a space vehicle with a device according to the present invention connected to part thereof.
Figure 2:
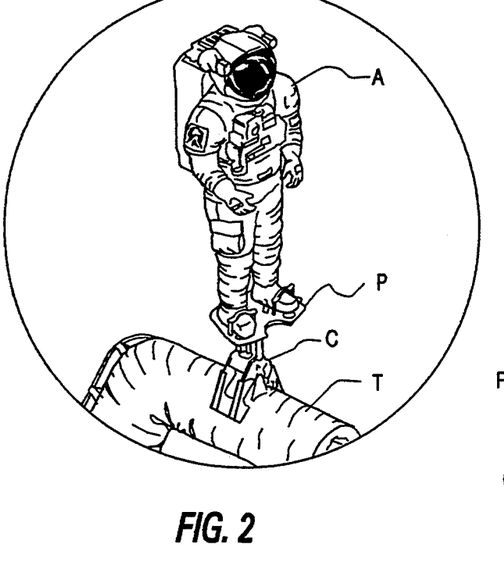
FIG. 2 is an enlarged view of a portion of the items shown in FIG. 1.
Figure 3:
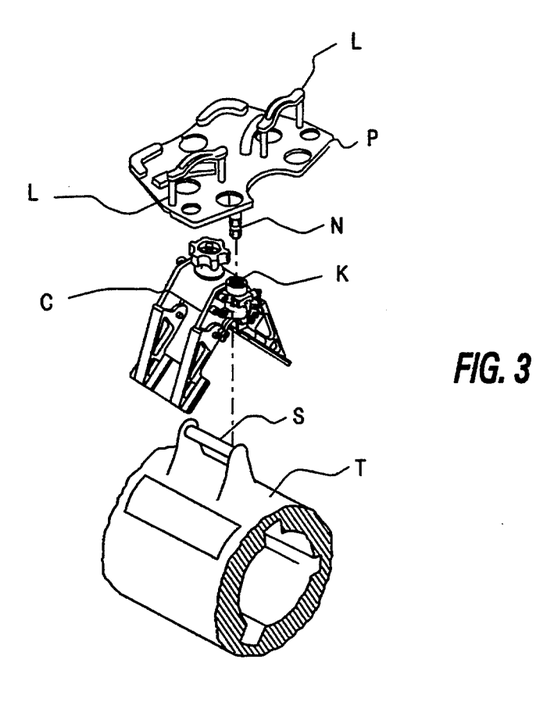
FIG. 3 is an exploded view of certain parts of the items shown in FIG. 1, including a device according to the present invention.

Referring now to FIGS. 1 and 2, a space shuttle vehicle V has an RMS arm R with an end effector T to which is connected a device C according to the present invention. A portable foot restraint P is secured in a socket K which in turn is secured to the device C. The feet of an astronaut A are in loops L of the restraint P. As shown in FIG. 3, a striker bar S is secured to the end effector T about which the device C is secured.

Figure 7:
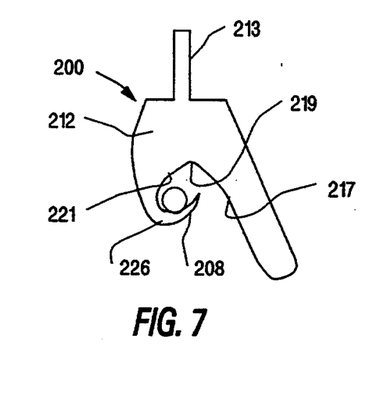
FIG. 7 is a side view of a device according to the present invention.

A device 200 according to this invention as shown in FIG. 7 has a body member 212, a handle 213 extending form one side of the body member, a hook 226 extending from another side of from the body member and a leg 220 also extending from the body member. A portion 217 of a body recess 219 and an interior surface 221 of the hook 226 define a capture envelope for receiving and confining a bar 208. The size of this envelope may be larger or smaller depending on the size of the bar to be captured and the desired degree of tightness with which it is desired to have the device 200 disposed about the bar 208.

Figure 8:
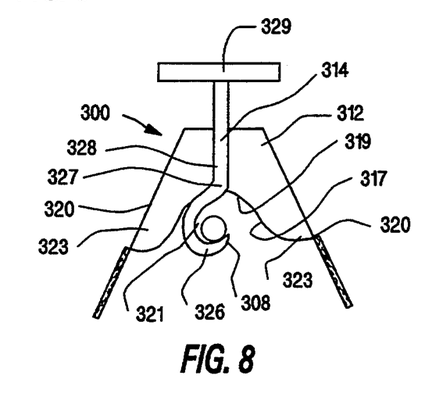
FIG. 8 is a side view of a device according to the present invention.

A device 300 according to the present invention as shown in FIG. 8 has a body member 312 with downwardly extending outriggers or legs 320 which extend from extending portions 323 of the body member 312. A shaft 314 extends movably through a shaft channel 328 through the body member 312. The shaft 314 is frictionally engaged in the shaft channel 328 by frictional contact between the shaft's exterior surface and the channel's interior surface. A hook 326 is secured to or formed integrally of and end 327 of the shaft 314. A portion 317 of a body recess 319 and a portion 321 of an interior surface of the hook 326 define a capture envelope for receiving a rod 308. Pulling on a handle 329 as shown in FIG. 8 to overcome the force of the frictional contact between the surfaces of the shaft and the shaft channel will reduce the size of the capture envelope and, if the rod 308 is therein, tighten the device 300 about the rod 308. The legs 320 may be employed to rest against a support member (not shown, but e.g. like the portion T in FIG. 3) to stabilize the device 300 in position and render more secure the disposition of the device 300 about the rod 308. The legs also serve the purpose of limiting the extent to which the handle 329 and hence the shaft 314 can be moved, i.e. the extent to which the device 300 can be tightened about the rod 308. Moving the shaft 314 toward the legs 320 enlarges the size of the capture envelope and loosens the device 300 from the rod 308.

Figure 18:
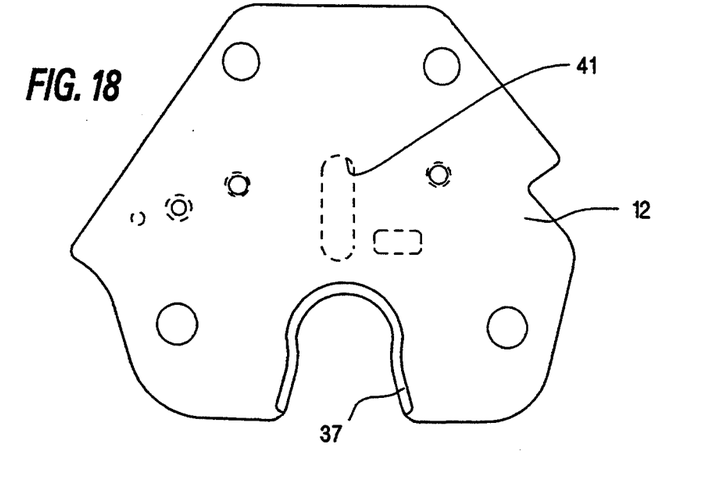
FIG. 18 is a front view of a body member of the device of FIG. 12.
Figure 19:
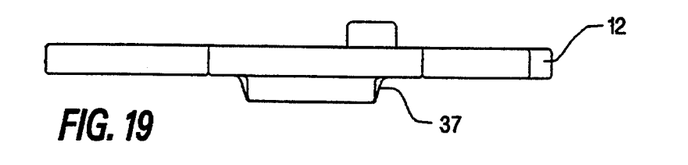
FIG. 19 is a top view of the body member of FIG. 18.
Figure 20:
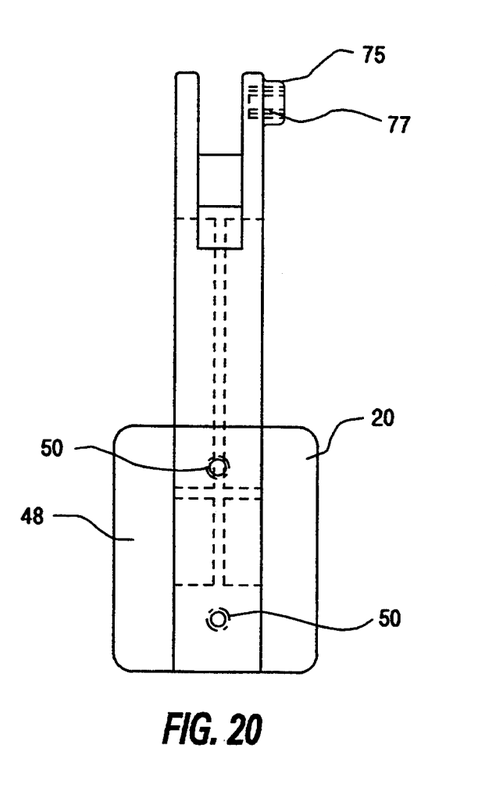
FIG. 20 is a front view of a leg of the device of FIG. 12.
Figure 21:
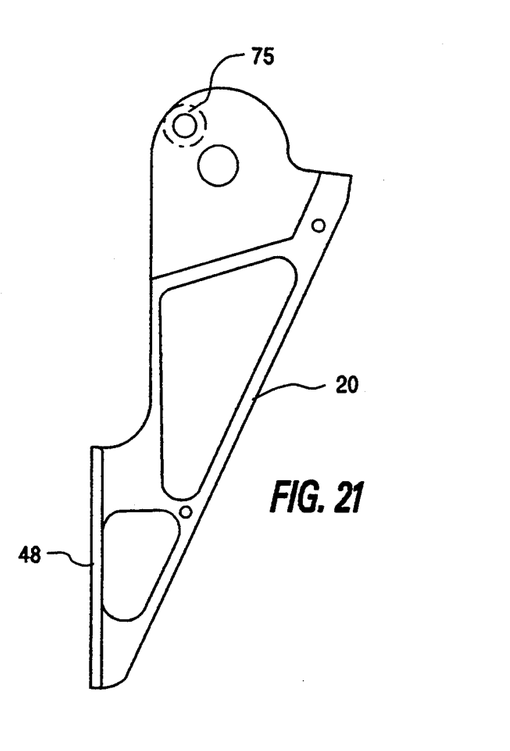
FIG. 21 is a side view of the leg of FIG. 20.

FIGS. 9–21 illustrate a device 10 according to the present invention and parts thereof. The device 10 has body members 12 mounted by bolts 9 to a body 11. Two legs 20 are pivotably connected to body members 12, each at a pivot point 30 with a bolt 32 and a nut 31. A stabilizing spreader link 34 connected between both legs 20 limits the extent to which the legs 20 can be separated. The spreader link 34 is pivotably connected to one of the legs 20 by a pin 33 and to the other leg 20 a pin 35. A lip 37 extending from the body member 12 serves as a stop abutment for the spreader link 34. A recess 41 in the body member 12 (FIG. 18) aligns with the slot 85 in the indicator plate 84 (FIG. 9) to permit viewing of the location of the dot 86. As shown in FIG. 20, each leg has an attachment projection 75 into a hole 77 of which extend the pins 33 and 35. One leg 20 (on the right side in FIG. 9; see also FIGS. 20 21) has a portion 38 which abuts a portion 40 of the body member 12 thus limiting outward motion of the leg 20. The other leg 20 (on the left side in FIG. 9) has a portion 42 which abuts a contingency release bar 44, thus limiting movement of this leg 20. When the legs 20 abut a support member to which a bar 8 is mounted, removal of the contingency release bar 44 by loosening hex nuts 46 permits movement of the leg 20 sufficiently to permit removal of the device 10 from about a bar 8.

Figure 12:
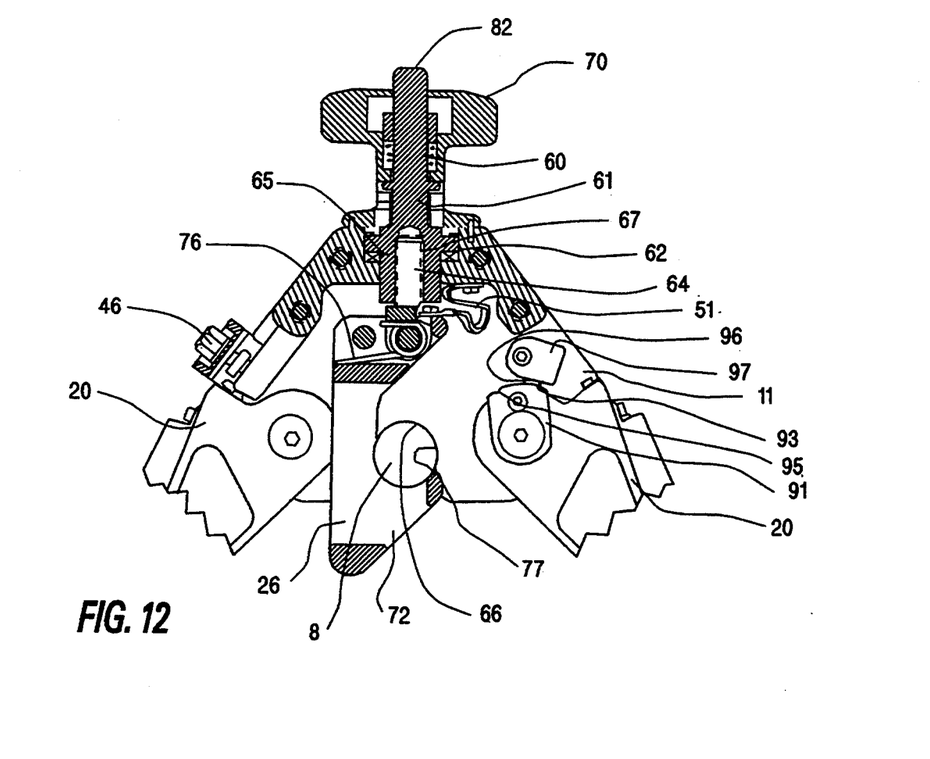
FIG. 12 is a partial side view in cross-section along line A—A of FIG. 11.

Reflectors 24 on the legs 20 facilitate visual recognition of the device 10. Each leg 20 has a pressure distribution pad or foot 48 secured thereto with screws 50 for distributing pressure of the device 10 and anything secured to it onto a support member, (not shown) interconnected with the bar 8. A grounding strap 51 is connected to the body member 12 and to the hook 26 (FIG. 12).

A PFR mount 52 secured to the body member 12 has a socket 54 for receiving a mating pin (not shown), e.g. a pin N as in FIG. 3) of an apparatus (not shown) to be secured to or mounted on the device 10.

A lanyard 87 is secured to rings 88 and 89 which in turn is connected to a pin 90 which coacts with a pin (such as the pin N) to secure a device in the PFR mount 52. A pull ring 29 connected to the pin 90 facilities pulling of the pin 90. A line 92 connected to the ring 88 and to the bar 44 prevents the bar 44, upon release, from floating away.

A detent member 91 secured to a leg 20 has notches 93 and 95 for coaction with a protrusion 96 on a member 97 secured to a body 11. Movement of the leg 20 is sufficient to pop the protrusion 96 free from either of the notches. A folded position of the legs 20 is illustrated by dashed lines in FIG. 9. In the folded position the protrusion 96 is in notch 95. In the extended position (e.g. as in FIG. 12) the protrusion 96 is in the notch 93.

A first shaft 60 (FIGS. 12,17) extends through a shaft channel 61 in the body member 12 and is rotatable therein. A second shaft 64 (FIGS. 12, 15, 16), partially within the first shaft 62, threadedly engages threads 65 of the first shaft 62 with its threads 67 so that rotation of the first shaft 62 effects movement of the second shaft 64 toward or away from a recess 66 in the body member 12 depending on which way the first shaft 62 is rotated. A knob 70 is releasably secured to the first shaft 62. A hook member 26 with a hook portion 72 is pivotably secured to the second shaft 64 at a pivot point 74. A spring 76 urges the hook member 26 toward the bar 8.

An interior surface 78 of the hook member 26 and a portion 77 of the recess 66 define a capture envelope for the bar 8. Movement of the hook member 26 away from the recess 66 enlarges the capture envelope and movement toward it diminishes the capture envelope's size.

A portion 82 of the first shaft 62 extends from the knob 70 and is preferably configured hexagonally to provide easy affixation thereto of a wrench or the like to turn the first shaft 62 to loosen the grip of the hook member 26 thereby freeing the device 10 from the bar 8. Such external turning of the knob may be required if the knob freezes against rotation.

Figure 9:
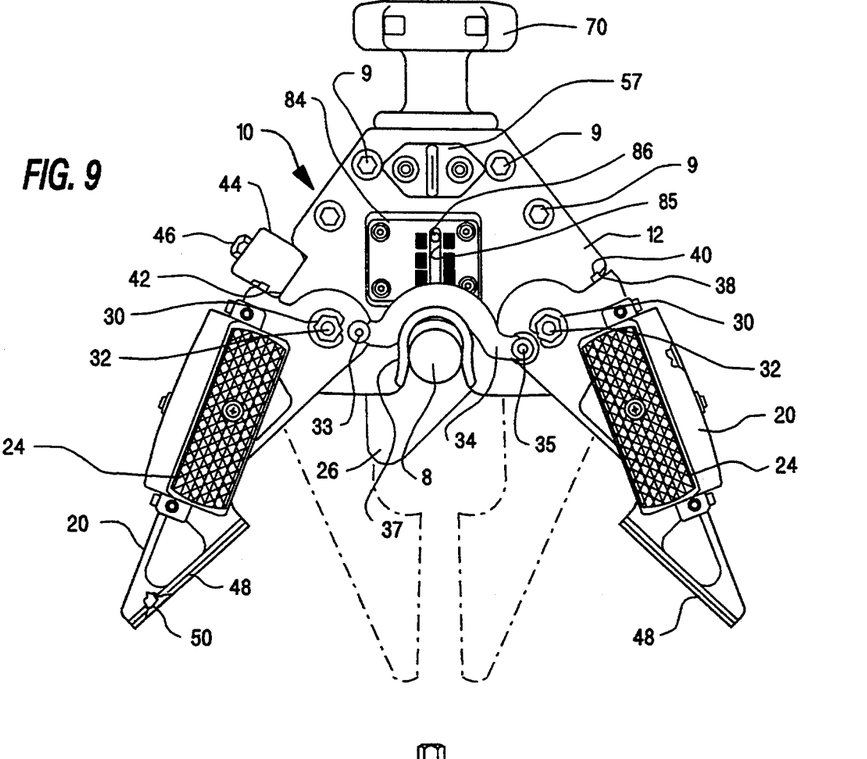
FIG. 9 is a front view of a device according to the present invention.
Figure 10:
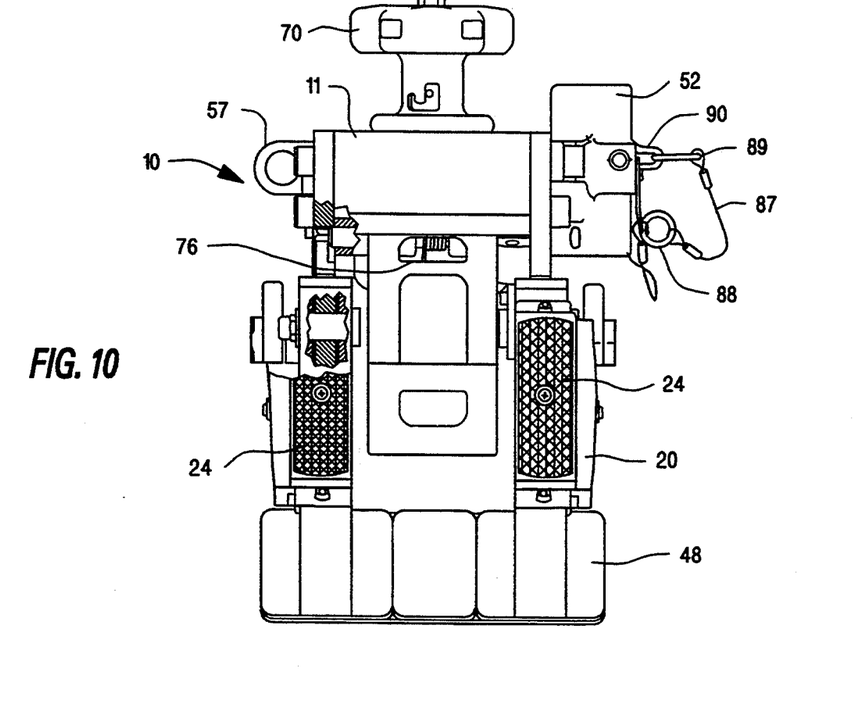
FIG. 10 is a side view of the device of FIG. 9.
Figure 11:
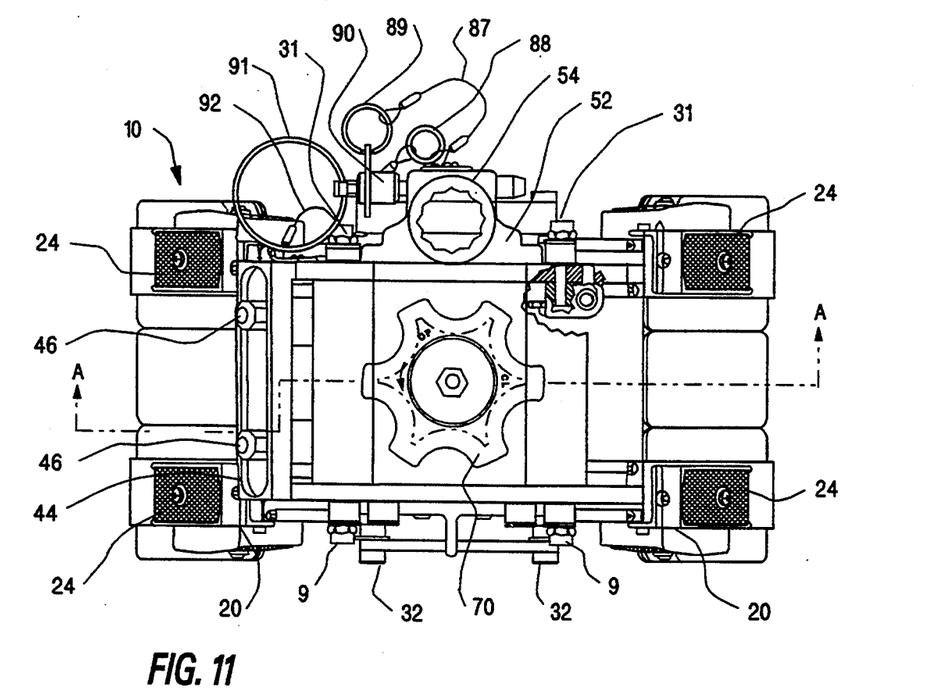
FIG. 11 is a top view of the device of FIG. 9.

As shown in FIG. 9 an indicator plate 84 has a slot 85 therethrough through which is visible a dot 86 on the hook member 26. The position of the dot 85 provides an indication of the position of the hook member 26 and thereby an indication of the status of or type of attachment of the device 10 about the bar 8. For example as shown in FIG. 9 each of the indicated three legends indicates a different device status; "CL" indicates "Closed" or that the hook member 26 has been tightened against the bar 8 and, if a support member for the bar 8 is present, that the legs 20 are disposed against the support member and the device 10 is stabilized thereon; "SD" indicates "Soft Dock" or that the capture envelope has been diminished in size to the point that the bar 8, although the hook member 26 has not been tightened against it, cannot escape from the capture envelope and that limited movement of the device 10 with respect to the bar 8 is possible; and "OP" or "Open" indicates that the capture envelope has been substantially increased in size, e.g. to its largest possible extent, facilitating initial emplacement of the device 10 about the bar 8, but also permitting the greatest degree of freedom between the two, with the possibility that the bar 8 may easily escape from the capture envelope.

Figure 4:
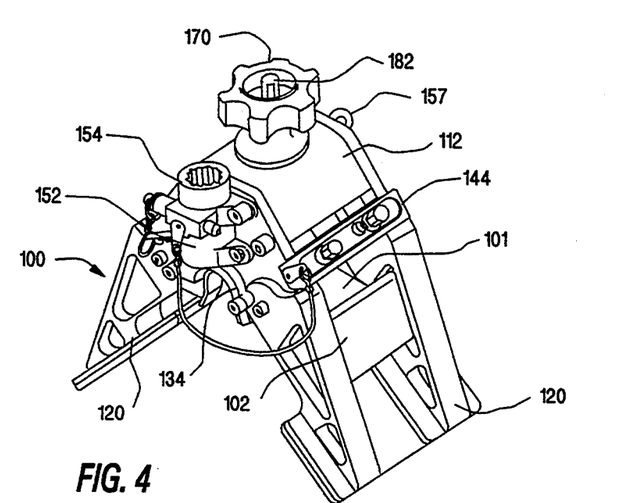
FIG. 4 is a perspective view of a device according to the present invention.
Figure 5:
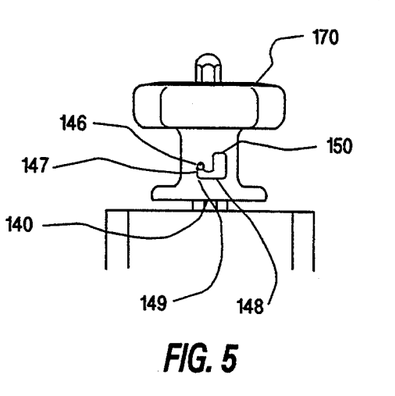
FIG. 5 is a side view of part of a device according to the present invention.
Figure 6:
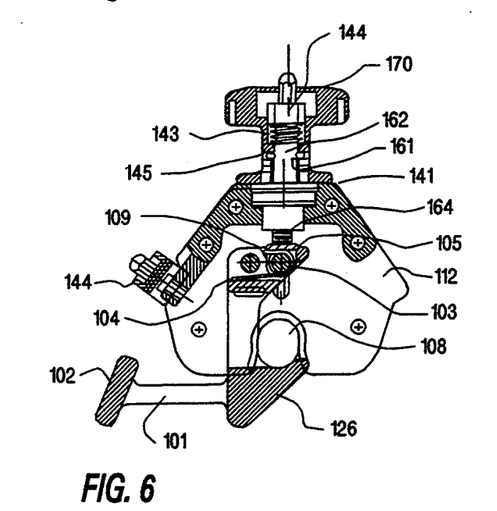
FIG. 6 is an enlarged view in cross-section of part of a device according to the present invention including the device of FIG. 5.

FIGS. 4, 5, and 6 show a device 100 according to the present invention which is similar to the device 10, but which has no reflectors. The device 100 also has a contingency release lever 101 which extends from a hook member 126 (like the hook member 26, FIG. 12). A handle 102 is formed of an end of the lever 101. Although a spring 102 (normally biased against a ridge 104 on the hook member 126 and against a shoulder 105 on a top of the hook member 26) urges the hook member 126 against a bar 108 (to the right in FIG. 6), pulling outwardly and upwardly on the handle 102 moves the hook member 126 away from the bar 108 permitting quick and easy release of the device 100 from the bar 108. The spring 103 is disposed on a shaft 109 which connects the hook member 126 to a second shaft 164 pivotally mounting the hook member to the second shaft 164 (like the shaft 64) which is movable up and down by a first shaft 162 (like the shaft 62). A shaft channel 161 contains portions of the shaft 162.

A knob 170 secured to the first shaft 162 is rotatable to rotate the first shaft 162 (which is rotable in the shaft channel 161) to effect rotation and thereby upward and downward movement of the second shaft 164 and of the hook member 126. The knob 170 can be releasably locked in position by inserting a locking pin 140 projecting from a bottom of the knob 170 into a pin recess 141 in a top 142 of a body member 112 through which the shaft channel 161 extends. A spring 143 normally urges the knob 170 downwardly, forcing the locking pin 140 into the pin recess 141. The spring 143 biases against a bottom edge of a nut 144 and against a shoulder 145 of the knob 170 pushing the shoulder 145 and thereby the knob 170 downwardly. Disposition of a shaft pin 146 of the shaft 162 in a left slot 147 of a J slot 148 releasably unlocks the knob 170 with the locking pin 140 out of the pin recess 141 (FIG. 5). Pulling upwardly on the knob 170 against the force of the spring 143 moves the shaft pin 146 down in the left slot 147, thus raising the locking pin 140 out of the pin recess 141. Turning the knob 170 clockwise then moves the shaft pin 146 in a bottom slot 149 of the J slot 148 until the shaft pin enters a right slot 150 of the J slot 148. As the shaft pin 140 rises to the top of the slot 150, the locking pin 140 moves into the pin recess 141 (FIG. 6), preventing normal rotation of the knob 170. As desired, the knob 170 can again be manipulated so that the locking pin 140 is removed from recess 141 and the knob 170 is again rotatable.

The device 100 (FIG. 6) has structures like the structures of the device 10, FIG. 9; including foldable legs 120; stabilizing link 134; contingency release bar 144; a PFR mount 152 with a PFR socket 154; and a contingency hex portion 182 of the shaft 162. The device 100 has an equipment tether loop 157 like a similar loop 57 on the device 10.

Figure 13:
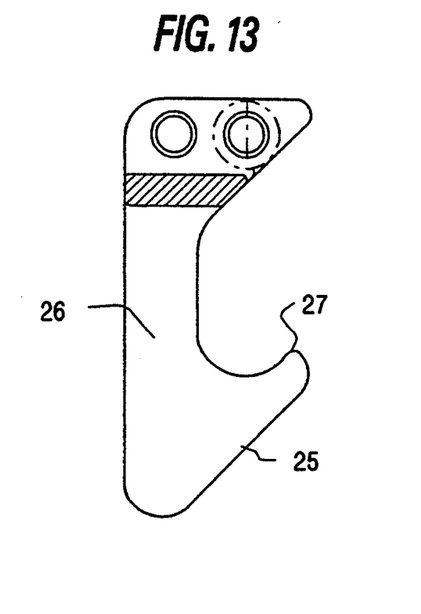
FIG. 13 is a side view of a hook of the device of FIG. 12.
Figure 14:
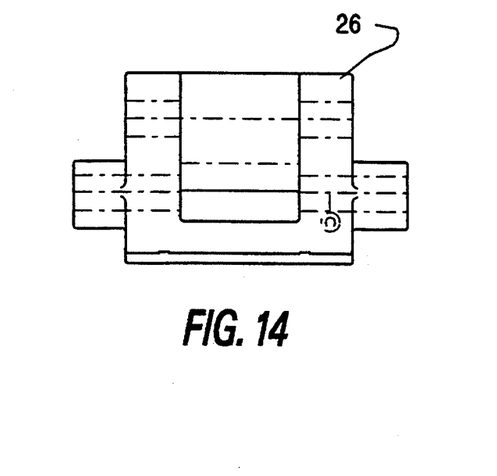
FIG. 14 is a top view of the hook of FIG. 13.
Figure 15:
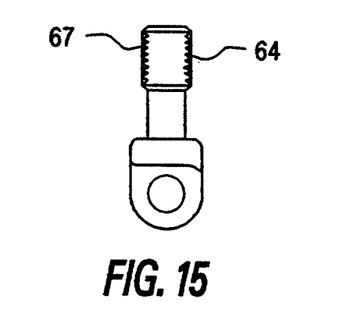
FIG. 15 is a side view of a second shaft of the device of FIG. 12.
Figure 16:
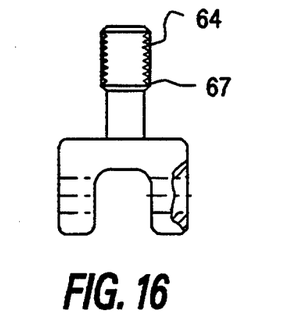
FIG. 16 is a front view of the shaft of FIG. 15.
Figure 17:
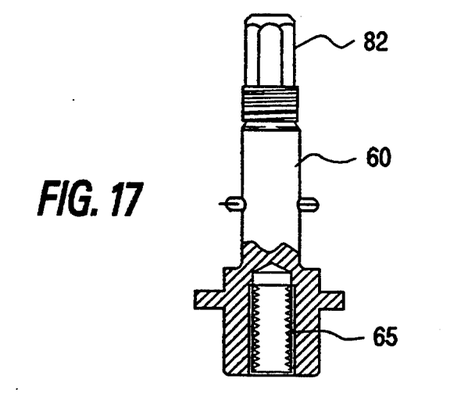
FIG. 17 is a side view partially in cross-section of a first shaft of the device of FIG. 12.

As shown in FIG. 13 the hook 26 has an inclined surface 25 which, upon contacting a rod or bar as the device 10 is moved toward a rod or bar, slides on and past the rod or bar until a tip 27 of the hook has moved slightly beyond the rod or bar. At this point the spring 76 urges the hook 26 back toward and under the rod or bar. When the hook is in a lower "SD" position, a soft dock is accomplished.

Figure 22:
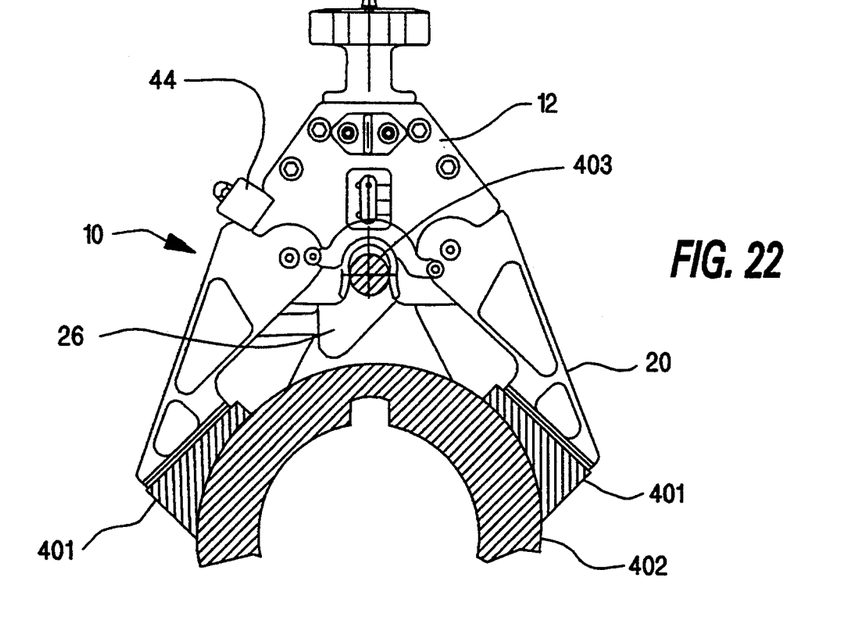
FIG. 22 shows a device according to the present invention installed about a bar and disposed against a bar support.
Figure 23:
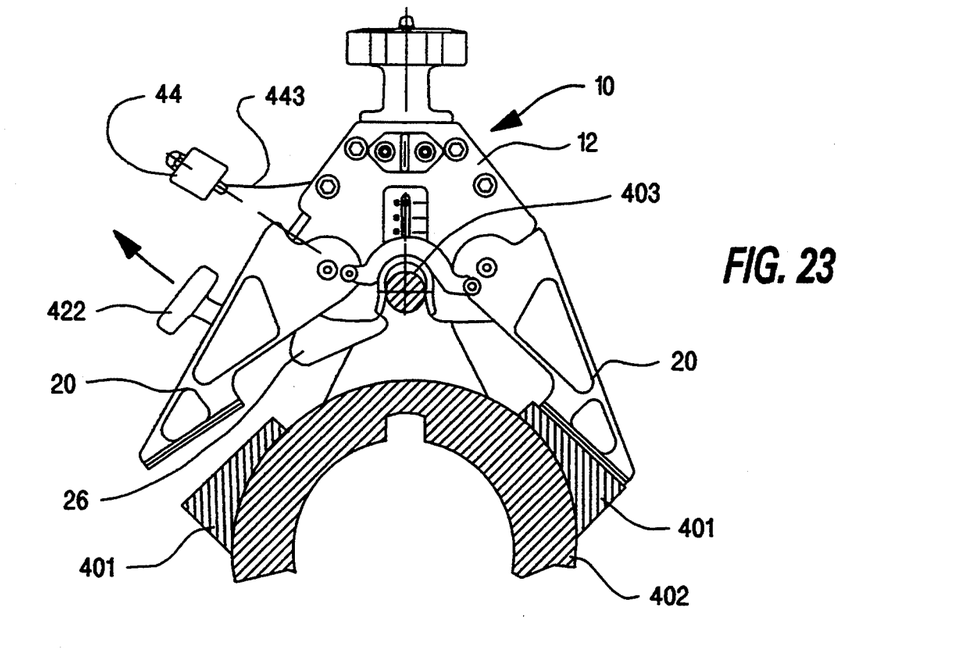
FIG. 23 shows the device of FIG. 22 releasing from the bar.

FIGS. 22 and 23 show the device 10 with its legs 20 disposed against outer blocks 401 of a bar support 402. The hook 26 of the device 10 is in a "Closed" position about a bar 403 which is secured to the bar support.

As shown in FIG. 23 the contingency release bar 44 has been removed from the device 10 thereby freeing the leg 20 on the left in FIG. 22 so that movement of a hook extension member 422 in the direction of the arrow (FIG. 22) releases the hook 26 from about the bar 403 thereby releasing the device 10 from the bar 403. A line 443 attached at one end to the contingency release bar 44 and at the other end to the body member 12 prevents the contingency release bar from floating away.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A capture device for capturing a rod, the device comprising,
    a body member with a body recess therein on one side thereof and a shaft channel therethrough,
    a shaft extending through the shaft channel with portions thereof extending beyond opposite sides of the body member, the shaft frictionally engaging an interior surface of the shaft channel and held therein by frictional contact,
    a hook on an end of the shaft on the same side of the body member as the body recess,
    a portion of the hook and a portion of the body recess defining a capture envelope for receiving and confining the rod, the rod being secured to a rod support member, at least one leg extending from the body member for contacting the rod support member to stabilize contact between the device and the rod, and a contingency release bar releasably secured to the body member in contact with at least one leg, release of the contingency release bar permitting movement of at least one leg to free the device from about the rod.

2. The device of claim 1 wherein the shaft is movable within the shaft channel by overcoming force of the frictional contact between the shaft and the shaft channel, the shaft movable to move the hook toward the body recess to reduce size of the capture envelope and secure the device about the rod.

3. The device of claim 2 wherein the shaft is threadedly engaged with mating threads in the shaft channel, and movement of the shaft is effected by rotating it in the shaft channel.

4. The device of claim 2 including also a knob on an end of the shaft on a side of the body member opposite the side on which the hook is located, and releasable locking means for locking the knob in position so that its movement is prevented until the locking means is released.

5. The device of claim 1 including the hook movably connected to the shaft, and urging means contacting the hook for urging the hook toward the rod.

6. The device of claim 5 including the hook having a hook extension member which when pulled away from the rod overcomes force of the urging means releasing the hook from the rod.

7. The device of claim 1 wherein the at least one leg is two legs, one of each of the two legs extending from opposite sides of the body member.

8. The device of claim 7 wherein the two legs are movably secured to the body member for accommodating support members of varying size, the legs releasably secured for preventing movement thereof upon disposition on a support member.

9. The device of claim 1 including mounting means secured to the body member for mounting an apparatus on the device, the apparatus securable to or in the mounting means.

10. The device of claim 9 wherein the mounting means is releasably secured to the body member for quick release therefrom.

11. The device of claim 1 including light reflector means secured thereto for reflecting light.

12. The device of claim 1 including indicator means on the body member for visually indicating status of the capture envelope.

13. The device of claim 1 wherein each at least one leg has a pressure distributing reaction foot at an end thereof for distributing pressure on the support member.

14. A capture device for capturing a rod, the device comprising, a body member with a body recess therein on one side thereof and a shaft channel therethrough, a shaft extending through the shaft channel with portions thereof extending beyond opposite sides of the body member, the shaft frictionally engaging an interior surface of the shaft channel and held therein by frictional contact, the shaft comprises a first shaft member and a second shaft member, the first shaft member rotatable within the shaft channel, the first shaft having a threaded second shaft channel therein, the second shaft threadedly engaging the threaded second shaft channel so that upon rotation of the first shaft the second shaft is movable with respect to the body member, a hook connected to an end of the second shaft on the same side of the body member as the body recess, and a portion of the hook and a portion of the body recess defining a capture envelope for receiving and confining the rod.

15. A method for facilitating contingency extra vehicular activity tasks from a space shuttle orbiter which is provided with a remote manipulator arm having a striker bar adjacent the end thereof, said method comprising, manifesting a lightweight portable foot restraint attachment device on every flight, attaching the foot restraint attachment device to the remote manipulator arm in the event extra vehicular activity is required, the attachment device provided with a clamp which securely engages the striker bar, outriggers which provide lateral support and a socket to receive a portable foot restraint which secures the feet of a crewmember.

16. A device to facilitate extra vehicular activity tasks from a space shuttle orbiter which is provided with a cylindrical remote manipulator arm having a striker bar adjacent the end of the remote manipulator arm, said device comprising, a body member positionable above the striker bar, the body member provided with a recess therein on a side opposing the striker bar and a shaft channel therethrough, a shaft extending through the shaft channel with portions thereof extending beyond opposite sides of the body member, a hook on an end of the shaft on the same side of the body member as the body recess, a portion of the hook and a portion of the body recess defining a capture envelope for receiving and confining the striker bar, means to move the hook toward the body recess to reduce the size of the capture envelope and firmly secure the device to the striker bar, a pair of movable legs on the ends of the body member having pads on the ends thereof for contacting the cylindrical remote manipulator arm and providing lateral support for the device, and a socket in the body member for receiving a portable foot restraint.

* * * * *